United States Patent
Nyzen et al.

(10) Patent No.: US 10,041,497 B2
(45) Date of Patent: Aug. 7, 2018

(54) PRESSURE COMPENSATION CONTROL OF A FIXED DISPLACEMENT PUMP IN A PUMPING AND METERING SYSTEM AND ASSOCIATED METHOD

(71) Applicant: EATON CORPORATION, Cleveland, OH (US)

(72) Inventors: Robert Nyzen, Hiram, OH (US); Martin A. Clements, North Royalton, OH (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 648 days.

(21) Appl. No.: 14/397,599

(22) PCT Filed: May 1, 2013

(86) PCT No.: PCT/US2013/039026
§ 371 (c)(1),
(2) Date: Oct. 28, 2014

(87) PCT Pub. No.: WO2013/166122
PCT Pub. Date: Nov. 7, 2013

(65) Prior Publication Data
US 2015/0125313 A1    May 7, 2015

Related U.S. Application Data

(60) Provisional application No. 61/641,088, filed on May 1, 2012, provisional application No. 61/664,422, filed
(Continued)

(51) Int. Cl.
*F04D 15/00*    (2006.01)
*F02C 7/236*    (2006.01)
(Continued)

(52) U.S. Cl.
CPC .......... *F04D 15/0072* (2013.01); *F02C 7/232* (2013.01); *F02C 7/236* (2013.01);
(Continued)

(58) Field of Classification Search
CPC ............. F04D 15/0072; F04D 15/0066; F04D 15/0011; F04D 15/0022; F04D 13/06;
(Continued)

(56) References Cited

U.S. PATENT DOCUMENTS 3,899,877 A * 8/1975 Flanigan ............... B60W 10/04
477/30
5,111,653 A   5/1992 Leeson
(Continued)

OTHER PUBLICATIONS

PCT/US2013/039026, "International Search Report and Written Opinion", dated Oct. 24, 2014.
(Continued)

*Primary Examiner* — Nathan Zollinger
(74) *Attorney, Agent, or Firm* — Fay Sharpe LLP

(57) ABSTRACT

A fuel system includes a pump unit having at least a fixed displacement pump supplying pressurized flow. A fuel control assembly receives flow from the pump unit and includes at least one metering valve and at least one throttling valve. A control (bypass valve control) for the fixed displacement pump receives first and second pressure signals indicative of a pressure differential across the throttling valve, or across the metering valve/throttling valve combination, for altering output from the fixed displacement pump in response to the pressure differential. In other embodiments, the pump unit includes a centrifugal pump and a fixed displacement pump that can be fully or partially redundant depending on sizing of the pumps, and the system requirements.

28 Claims, 7 Drawing Sheets

Related U.S. Application Data on Jun. 26, 2012, provisional application No. 61/664,447, filed on Jun. 26, 2012, provisional application No. 61/757,281, filed on Jan. 28, 2013.

(51) Int. Cl.
| | | |
|---|---|---|
| *F02C 9/30* | (2006.01) | |
| *F02C 7/232* | (2006.01) | |
| *F04B 23/10* | (2006.01) | |
| *F04B 23/14* | (2006.01) | |
| *F04B 49/08* | (2006.01) | |
| *F04D 13/06* | (2006.01) | |
| *F04D 13/14* | (2006.01) | |

(52) U.S. Cl.
CPC ............... *F02C 9/30* (2013.01); *F04B 23/10* (2013.01); *F04B 23/14* (2013.01); *F04B 49/08* (2013.01); *F04D 13/06* (2013.01); *F04D 13/14* (2013.01); *F04D 15/0011* (2013.01); *F04D 15/0022* (2013.01); *F04D 15/0066* (2013.01); *F05B 2210/11* (2013.01); *F05B 2270/1033* (2013.01); *F05B 2270/3015* (2013.01)

(58) Field of Classification Search
CPC .......... F04D 13/14; F04B 23/10; F04B 49/08; F04B 23/14; F05B 2270/1033; F05B 2270/3015; F05B 2210/11; F02C 7/236; F02C 7/232; F02C 7/22; F02C 9/30; F02C 9/38; F02C 9/263; F02C 9/32
See application file for complete search history.

(56) References Cited

U.S. PATENT DOCUMENTS

| | | | |
|---|---|---|---|
| 5,118,258 A | 6/1992 | Martin | |
| 5,715,674 A | 2/1998 | Reuter et al. | |
| 6,135,135 A | 10/2000 | Futa, Jr. et al. | |
| 6,810,674 B2 | 11/2004 | Clements | |
| 6,981,359 B2 | 1/2006 | Wernberg et al. | |
| 7,007,452 B1 * | 3/2006 | Baryshnikov | F02C 7/232 |
| | | | 60/39.094 |
| 7,096,658 B2 | 8/2006 | Wernberg et al. | |
| 7,431,015 B2 * | 10/2008 | Mahoney | F23K 5/147 |
| | | | 123/434 |
| 7,770,388 B2 | 8/2010 | Desai | |
| 7,845,177 B2 | 12/2010 | Parsons | |
| 7,966,994 B2 | 6/2011 | Kleckler | |
| 8,205,597 B2 | 6/2012 | Brocard et al. | |
| 9,133,772 B2 * | 9/2015 | Heitz | F02C 9/263 |
| 2004/0011052 A1 | 1/2004 | Clements | |
| 2005/0016176 A1 * | 1/2005 | Griffiths | F02C 9/28 |
| | | | 60/734 |
| 2005/0223690 A1 | 10/2005 | Wernberg et al. | |
| 2007/0175449 A1 | 8/2007 | Mahoney | |
| 2008/0163931 A1 | 7/2008 | Brocard et al. | |
| 2009/0301575 A1 | 12/2009 | Arnett | |

OTHER PUBLICATIONS

PCT/US2013/039026, "International Preliminary Report on Patentability (Chapter 1 of the Patent Cooperation Treaty)", dated Nov. 4, 2014.

\* cited by examiner

PRESSURE COMPENSATION CONTROL OF A FIXED DISPLACEMENT PUMP IN A PUMPING AND METERING SYSTEM AND ASSOCIATED METHOD

This national stage application is a submission under 35 U.S.C. 371 of PCT International Patent Application No. PCT/US2013/039026, filed on 01 May 2013, and claims the priority benefit of US Provisional Application Nos. 61/641,088, filed on May 01, 2012; 61/664,422, filed on Jun. 26, 2012; 61/664,447, filed on Jun. 26, 2012; and 61/757,281, filed on Jan. 28, 2013, the disclosures of which are incorporated herein by reference.

BACKGROUND

The present disclosure relates to a fuel system, and more particularly to a system that includes at least a supplemental fixed displacement pump. It finds particular application in conjunction with a fuel metering system, and will be described with particular reference thereto. However, it is to be appreciated that the present exemplary embodiment is also amenable to other like applications.

Generally, a high speed centrifugal pump is desired in a fuel system because of the benefits related to power consumption. Further, the centrifugal pump is generally lightweight, is deemed to have an extended life, has limited pressure ripple, and is generally conducive for a wide array of downstream uses. When trying to apply high-speed centrifugal pump technology in connection with fuel pumps associated with aircraft engine applications, for example, certain conditions need attention. Engine start is one area because the high speed centrifugal pump does not provide the required elevated fuel pressures for start-up until the engine speed has increased to a certain level. Therefore, there is a need to start the engine with a relatively low drive speed.

A fixed displacement pump is often incorporated into the fuel system to address the low pressure rise from the centrifugal pump at low engine speed. The fixed displacement pump provides the additional required pressure and flow at engine start. In addition to using the fixed displacement pumping stage to provide engine start, i.e. satisfy engine start requirements, the fixed displacement pump likewise delivers pressures beyond the maximum pressure delivered by the centrifugal stage when needed for other uses.

In order to provide accurate metered flow, and reduce the pressure to a level required downstream, a centrifugal based pump and metering system works based on pressure generation from the centrifugal pump and a throttling style metering system. However, for the fixed displacement pump to work in the throttling style metering system, the fixed displacement pump must be pressure compensated. This would allow the centrifugal pump at low speed to combine with the additional pressure and flow offered by the fixed displacement pump to meet start-up requirements. Further, the fixed displacement pump can then be advantageously used to provide a pressure increase above the discharge of the centrifugal pump output once the centrifugal pump has reached a maximum speed and maximum pressure output and there is a need for additional output.

Accordingly, a need exists for providing additional system capability (and an associated method) to a fuel system that includes a centrifugal pump and throttling style metering system in a manner that is economical, effective, compact, simple, automatic, pressure compensated, adaptable to one or more metering loops, and that addresses the need for additional pressure and flow, for example, at engine start when engine speed is low.

BRIEF DESCRIPTION

A fuel system includes a pump unit that includes a fixed displacement pump for supplying pressurized flow. A fuel control assembly receives flow from the pump unit, and includes at least one metering valve and at least one throttling valve. A control for the fixed displacement pump receives first and second signals indicative of a pressure differential across at least the throttling valve, or across the metering valve/throttling valve combination, for altering operation of the fixed displacement pump in response to the pressure differential.

In another embodiment, the pump unit includes a supplemental pump incorporated into the fuel system to address the low pressure rise from a centrifugal pump at low engine speed. The supplemental pump provides the additional required pressure and flow at engine start. In addition to using the supplemental pumping stage to provide engine start, i.e. satisfy engine start requirements, the supplemental pump likewise delivers pressures beyond the maximum pressure delivered by the centrifugal stage when needed for other uses.

In order to provide accurate metered flow, and reduce the pressure to a level required downstream, in one embodiment of the fuel system, the centrifugal based pump and metering system works based on pressure generation from the centrifugal pump and a throttling style metering system. However, for the supplemental pump to work in the throttling style metering system, the supplemental pump must be pressure compensated. This would allow the centrifugal pump at low speed to combine with the additional pressure and flow offered by the supplemental pump to meet start-up requirements. Further, the supplemental pump can then be advantageously used to provide a pressure increase above the discharge of the centrifugal pump output once the centrifugal pump has reached a maximum speed and maximum pressure output and there is a need for additional output.

The pump unit in one preferred embodiment includes a high speed centrifugal pump unit and the supplemental pump, namely a fixed displacement pump or pumping stage, with bypass valve control supplying pressurized flow. A fuel control assembly receives flow from the pump unit and includes at least one metering valve, and at least one throttling valve that receives flow from the metering valve. A bypass valve control for the fixed displacement pump receives first and second signals indicative of a pressure differential across at least the throttling valve (or a combination of the metering valve and throttling valve) for altering output from the fixed displacement pump in response to the pressure differential.

The first and second signals may be indicative of the pressure differential across at least the throttling valve, or across the combination of the metering valve and throttling valve.

The bypass valve control is a hydromechanical pressure compensation assembly and the first and second signals are pressure signals received from across at least the throttling valve (or the metering valve/throttling valve combination) in a preferred arrangement.

If more than one throttling valve is present, the bypass valve control is responsive to the throttling valve (or metering valve/throttling valve combination) with the lowest differential pressure.

In a preferred arrangement, the fixed displacement pump is always functioning in the main flow path and providing at least a minimum pressure rise. Switching between pumping stages is not required and therefore there are no potential disturbances in the fuel system to turning on/off pumps.

The high speed centrifugal pump is always wetted and operating essentially as a high pressure boost stage for the fixed displacement pump thus eliminating the need for turning the high speed pump on and off, or drying out the high speed pump.

At higher differential pressures, the fixed displacement pump is commanded by the bypass valve control to a minimum delivered flow output to the metering system.

If the differential pressure falls below a minimum differential pressure, the bypass valve control signals for the bypass valve to close allowing the fixed displacement pump system to increase the delivered flow and provide sufficient pressure to maintain the minimum pressure level across the throttling valve or metering valve/throttling valve combination.

The fixed displacement pump is operated at a minimum pressure rise when not required in order to minimize the input shaft power.

In one preferred arrangement, the fixed displacement pump and the centrifugal pump are driven at different relative rotational speeds (e.g., the fixed displacement pump is driven at approximately 50% of the rotational speed of the centrifugal pump in one embodiment, and may be coaxially driven (i.e., a single input drive shaft) or may have multiple drive shafts).

An inducer stage is provided in one modification and driven at a reduced rotational speed to operatively improve inlet performance characteristics of the centrifugal pump.

A method of operating a fuel system includes providing a pump unit that includes a fixed displacement pump to supply pressurized flow. The method further includes providing a fuel control assembly that includes at least one metering valve and at least one throttling valve, and monitoring a pressure differential across the throttling valve, or across the throttling valve and metering valve combination, and controlling operation of the pump unit in response to the pressure differential.

A method of operating another embodiment of a pump assembly includes providing a fuel system that includes a high speed centrifugal pump and a fixed displacement pump with bypass valve control to supply pressurized flow. The method further includes providing a fuel control assembly that receives flow from the pump unit and includes at least one metering valve and at least one throttling valve that receives flow from the at least one metering valve. The method also includes monitoring pressure differential across at least the throttling valve(s) (or across the combination of the throttling valve(s) and the metering valve(s)) and controlling operation of the pump unit in response to the pressure differential.

The method further includes receiving a first pressure signal upstream of the throttling valve, or upstream of the metering valve and the throttling valve combination, that is communicated to the fuel control assembly, and a second pressure signal from downstream of the throttling valve, or the metering valve/throttling valve combination.

The method includes using the signals to hydromechanically alter operation of the pump unit.

In one embodiment, the method includes using a fixed displacement pumping stage with a bypass valve control to provide engine start and achieve pressures beyond the maximum delivered by the centrifugal pumping stage.

The method may include using an inducer driven at a reduced rotational speed to operatively improve inlet performance characteristics of the centrifugal pump.

A primary benefit is the ability to supplement centrifugal pump output in a fuel system.

An advantage resides in incorporating a fixed displacement pumping stage with controlled bypass feature to provide engine start and increased pressures at desired times.

Desirably, the output from the fixed displacement pump is increased, and may be automatically engaged, only when necessary.

Further, the fixed displacement pump with bypass valve control is preferably controlled via a hydromechanical pressure.

Compensation of the fixed displacement pump using hydromechanical pressure results in better system stability and a faster response to system disturbances than a system that uses an electronic control.

Still other advantages and benefits of the disclosure will become apparent from reading and understanding the following detailed description.

DETAILED DESCRIPTION

Figure 1:
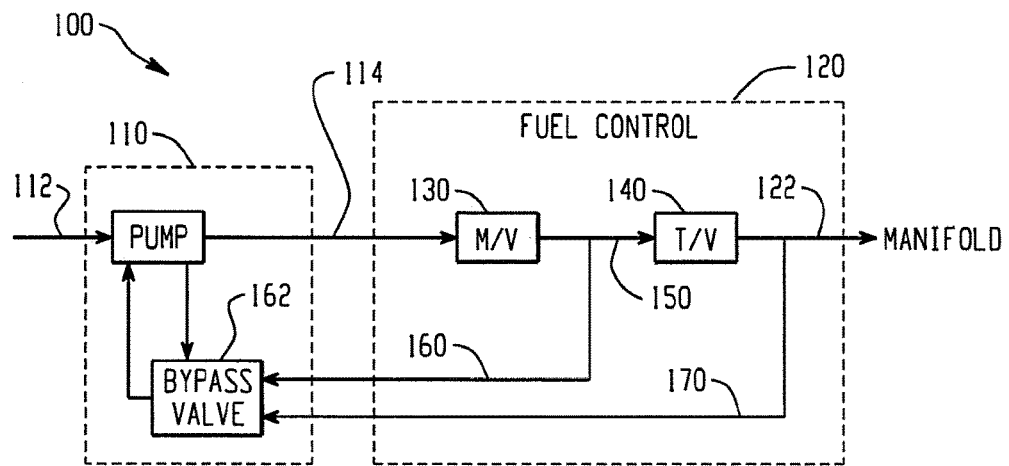
FIG. 1 is a schematic representation of the fuel system in a single metering loop configuration.

FIG. 1 is a schematic representation of a fuel system or pumping and metering system 100, and in particular is representative of a single metering loop. The system 100 includes a pump unit 110 such as a fuel pump for an aircraft engine that receives fluid from an upstream source (not shown) as represented by reference numeral 112 and delivers pressurized fluid 114 to a downstream fuel control 120 that controls fluid for one or more downstream uses represented by reference numeral 122. In the broadest sense, the fuel control 120 includes a metering valve 130 and a throttling valve 140.

The metering valve 130 receives the pressurized fluid 114 from the pump unit 110 and meters or delivers pressurized fluid 150 downstream to the throttling valve 140. The pump unit 110, and typically one used as a fuel pump for an aircraft engine, for example, includes a centrifugal pump for the reasons noted in the Background. As further described above, additional use of a fixed displacement pump with bypass valve control is also desired to supplement/provide the required pressure and flow for certain conditions. In order to use a fixed displacement pump with bypass valve control in this system, the fixed displacement pump with bypass valve control must be pressure compensated so as to perform with the throttling style fuel metering unit that is required for the centrifugal pump.

One method of control for the fixed displacement pump is to set a pressure compensation level. A problem is that this level must be set above the maximum that is needed by the system. Although this preselected pressure compensation level works well, the system power consumption is excessive when the fixed displacement pump is not required to be active. Therefore, there is a need to have a variable pressure compensation level.

FIG. 1 schematically represents a method of control that varies operation of the bypass valve control of the fixed displacement pump in response to varying pressure. More particularly, a first signal or first pressure signal 160 references the pressure of the fluid 150 at a location downstream of the metering valve 130 and upstream of the throttling valve 140. The first pressure signal 160 returns to the pump unit 110, and more particularly communicates with a bypass valve or bypass valve control portion 162 of the pump unit operatively associated with the fixed displacement pump of the pump unit 110. In addition, a second signal or second pressure signal 170 is indicative of the pressure of the pressurized fluid downstream from the throttling valve 140. The second pressure signal 170 is likewise returned to the pump unit 110, and more particularly to the bypass valve control portion 162 of the pump unit, associated with the fixed displacement pump. The first and second pressure signals 160, 170 sense the pressure differential or pressure drop across at least the throttling valve 140, or sense the pressure differential across the metering valve/throttling valve combination (e.g., if the first pressure signal is representative of the pressure downstream of the pump unit 110 and upstream of the metering valve 130). A minimum differential pressure is allowable in this system 100 and in such a situation only the centrifugal pump generates the pressure rise. If the differential pressure falls below this minimum, the control signals 160, 170 for the bypass valve control 162 of the fixed displacement pump alter the position of the bypass valve and thereby alter the contribution of the fixed displacement pump to the pump unit output to increase the delivered flow and provide enough pressure to maintain the minimum pressure level across the throttling valve 140. Thus, this arrangement and associated method of control provides for a variable pressure compensation level in connection with a supplemental, fixed displacement pump. The arrangement ensures that the downstream pressure requirements are always maintained and the system power level is maintained to a minimum. One skilled in the art will also appreciate that at higher pressure differentials, the fixed displacement pump is commanded to a minimum delivered flow because the centrifugal pump satisfies the system needs.

Figure 2:
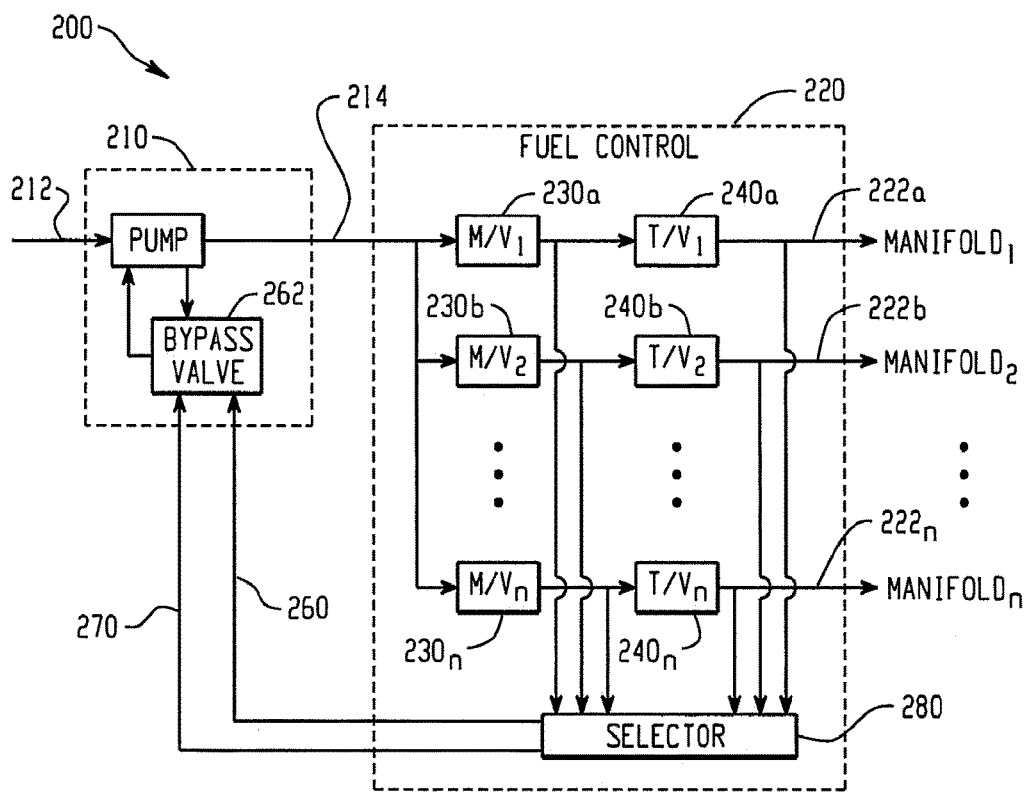
FIG. 2 is a schematic representation of the fuel system in a multiple metering loop configuration.

FIG. 2 is a schematic representation of a pumping and metering system 200 substantially similar to the system 100 described in connection with FIG. 1 and with the addition of multiple throttling valves. For purposes of brevity and ease of reference, like reference numerals in the "200" series will refer to like elements in the "100" series, and new reference numerals will be used to refer to new components. Likewise, the above description of the components and operation thereof in connection with FIG. 1 applies to the components and system of FIG. 2 unless noted otherwise. For example, pump unit 210 in FIG. 2 corresponds to pump unit 110 in FIG. 1. The fuel control 220 includes multiple metering valves individually identified as 230a, 230b, . . . 230$_n$ and similarly a like number of throttling valves 240a, 240b . . . 240$_n$ that cooperate with a respective metering valve. In the system of FIG. 2, the throttling valve (or metering valve/throttling valve combination as described above) with the lowest differential pressure is used to provide the first and second pressure signals 260, 270 to the pump unit 210, including to the bypass valve control 262 associated with the fixed displacement pump of the pump unit 210. Thus, a selector (or series of selector valves) 280 serves as a comparator so that the lowest pressure drop is ultimately communicated to the pump unit 210.

When the pressure drop or pressure differential across at least the throttling valve 240 is high, it is likely that the additional pressure provided by the fixed displacement pump is unnecessary. In other instances, such as engine start or other system operations where the high speed centrifugal pump may not provide all the desired pressure, the output of the high speed centrifugal pump is supplemented by the fixed displacement pump in order to meet system requirements. More importantly, the delivered flow level at which the fixed displacement pump is operated is now variable, i.e., not just "on" or "off" but instead operates at different flow levels, and that variable operation is hydromechanically responsive to monitoring of the pressure situation downstream, namely by monitoring the change in pressure across at least one or more throttling valves 240, or across the one or more metering valve/throttling valve combinations.

Figure 3A:
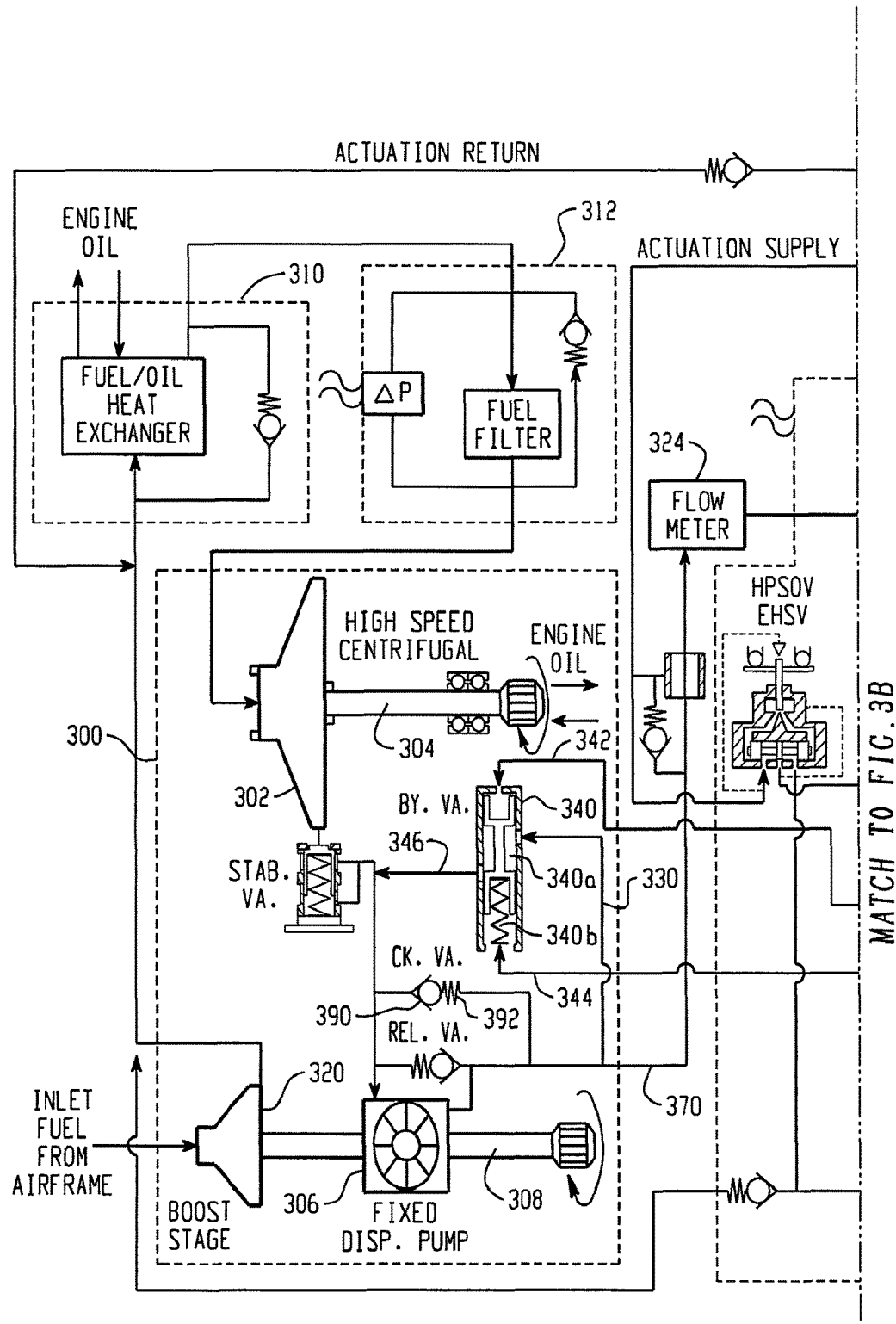
FIG. 3 is a system schematic of a fuel system that provides pressurized fluid to an actuation control module and a fuel metering unit.
Figure 3B:
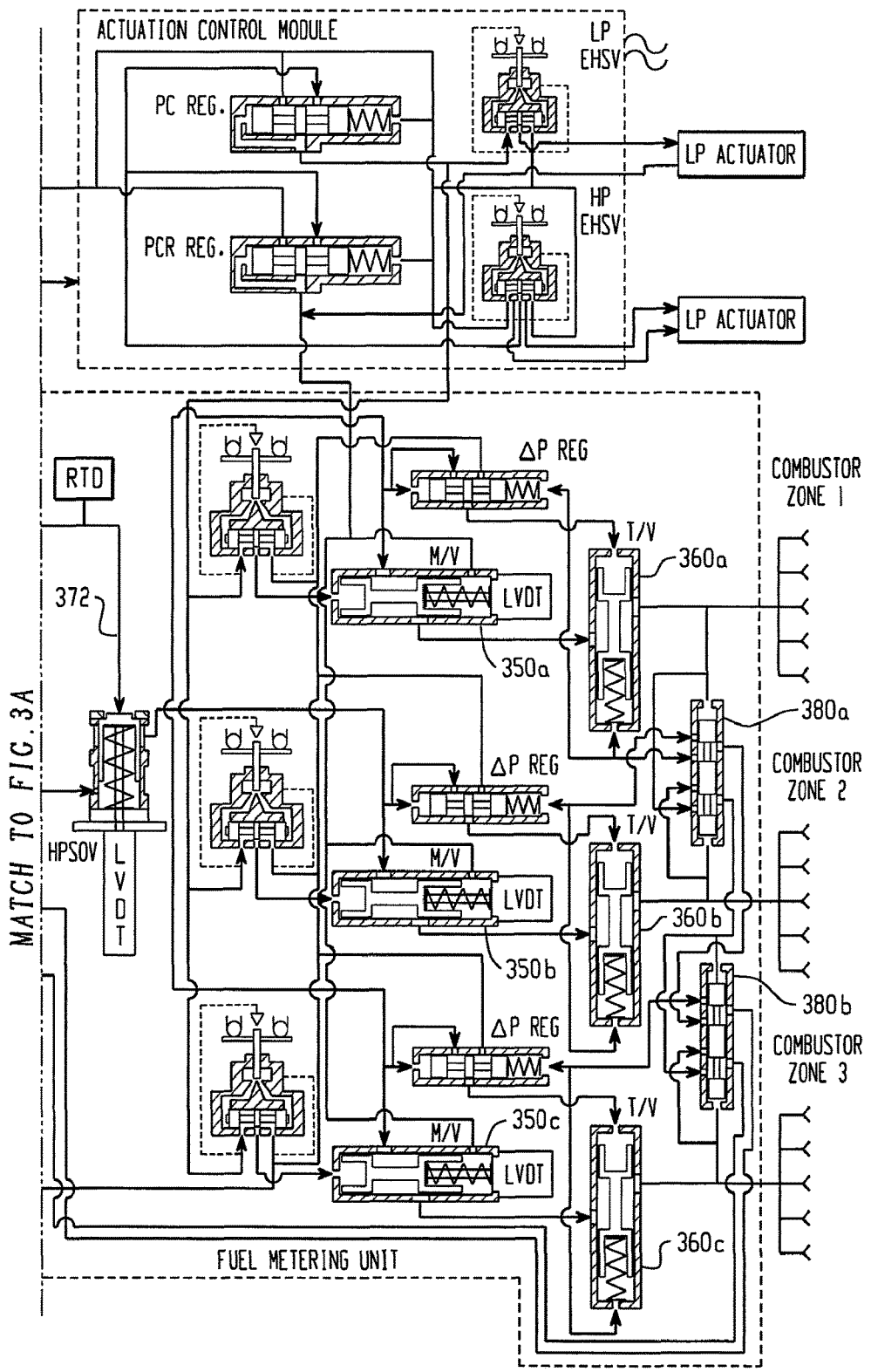

The embodiment of FIG. 3 has many similar components and operates in a generally similar manner to the previously described arrangements. More particularly, and as illustrated in FIG. 3, a fuel system has a pump unit 300 that includes a high speed centrifugal pump 302 driven by drive shaft 304. In addition, a supplemental, positive displacement pump, shown here as fixed displacement pump 306, on drive shaft 308 receives the flow from the high speed centrifugal pump 302. In addition, a boost stage pump 320 is coaxially driven on the shaft 308 of the positive displacement pump. The output from the boost stage pump 320 feeds the high speed centrifugal pump 302 via fuel/oil heat exchanger 310 and fuel filter 312. Thus, the boost stage pump 320, high speed centrifugal pump 302, and the supplemental pump 306 are preferably disposed in series relation.

The output from the fixed displacement pump 306 includes a branch passage 330 that leads to bypass valve 340. The bypass valve 340 receives pressure signals 342, 344 from across at least one of the throttling valves 360a, 360b, 360c, in generally the same manner as described above in connection with FIG. 2, or may be signals from across one of the combinations of metering valves 350a, 350b, 350c and the throttling valves 360a, 360b, 360c. More specifically, where there are multiple metering valves (350a, 350b, 350c) and likewise multiple throttling valves (360a, 360b, 360c), the pressure signals 342, 344 are taken from the throttling valve (or throttling valve and metering valve combination) with the lowest differential pressure.

Multiple metering loops are illustrated and particularly three loops are shown, although a greater or lesser number of loops can be used without departing from the scope and intent of this disclosure. Specifically, each metering loop includes a metering valve 350a, 350b, 350c and a respective throttling valve 360a, 360b, 360c. Pressure downstream of each metering valve 350a, 350b, 350c, and necessarily upstream of the corresponding throttling valve 360a, 360b, 360c is sent as a first signal to a selector 380. The selector 380 is shown here as including two selector valves 380a, 380b that receive respective first pressure signals. In a similar manner, second pressure signals are provided from downstream of respective throttling valves 360a, 360b, 360c to at least one of the corresponding selector valves to 380a, 380b. Thus, the first selector valve 380a compares the downstream pressures from the first and second throttling valves 360a, 360b and the signal from the throttling valve with the highest downstream pressure (lowest differential assuming upstream pressures are identical) is communicated to the second selector valve 380b where it is then compared with the downstream pressure across the third throttling valve 360c. The output from the second selector valve 380b is then communicated as first and second pressure signals 342, 344 to the bypass valve control 340 associated with the fixed displacement pump 306. A minimum differential pressure is allowed in the system and, in such a situation, the centrifugal pump 302 is required to meet all, or substantially all, of the system needs. However, if the differential pressure falls below the minimum value, the control signals 342, 344 allow control member 340a of the bypass valve 340 to alter the delivered flow of fixed displacement pump 306 and thereby increase the delivered flow to provide enough pressure to maintain the minimum pressure level as required to meet system needs. The bypass valve control member 340a includes a biasing member such as spring 340b that urges the control toward a first position in the absence of the control signals 342, 344 urging the control member 340a to a different position whereby the amount of bypass flow from the fixed displacement pump 306 may be altered to achieve pressure compensation. A minimum differential pressure is allowable in this system for which the centrifugal pump 302 generates all, or substantially all, of the pressure rise. If the differential pressure falls below this minimum, the control 340 (as determined by the pressure signals 342, 344) signals the bypass valve 340 to begin to close and thus the fixed displacement pump pressure rise will increase to maintain the minimum pressure level across the throttling valve. This method of control provides for a variable pressure compensation level. This ensures that the downstream pressure requirements are always maintained and the system power level is maintained to a minimum. At higher throttling valve pressure differentials, the fixed displacement pump 306 is completely or substantially bypassed.

The pump unit 300 advantageously combines the high speed centrifugal pump stage 302 and the fixed displacement pump 306. Generally, when pressure in excess of what the high speed centrifugal pump 302 can produce alone is required, the fixed displacement pump stage 306 is used as a pressure compensated-style pump to supplement the high speed centrifugal pump output pressure. Typically, the fixed displacement pump 306 will provide the majority of the pump pressure during engine start and at extreme engine takeoff conditions.

In FIG. 3, a check valve 390 allows flow from the centrifugal pump to proceed to passage 370 for delivery to the downstream fuel metering unit if the fixed displacement pump 306 was to fail. The biasing force (e.g., provided by spring 392) of the check valve 390 is overcome at a predetermined pressure to establish a bypass around the fixed displacement pump. It will also be recognized that reverse flow through the check valve 390 is precluded by the check valve action when the fixed displacement pump 306 is operational.

Therefore, it is desirable to have a variable pressure compensation level. In the schematics shown, the metering unit can have one or more metering loops comprised of a metering valve, pressure regulator, and throttling valve. The pressure regulator is used to set the throttling valve position in order to maintain a desired differential pressure across the metering valve. The pressure compensation of the fixed displacement pump is achieved through the use of the bypass valve that senses the differential pressure across the throttling valve, or in the case of multiple throttling valves, the throttling valve with the lowest differential pressure. Differential pressure can also be sensed across both the throttling and metering valves.

Figure 4A:
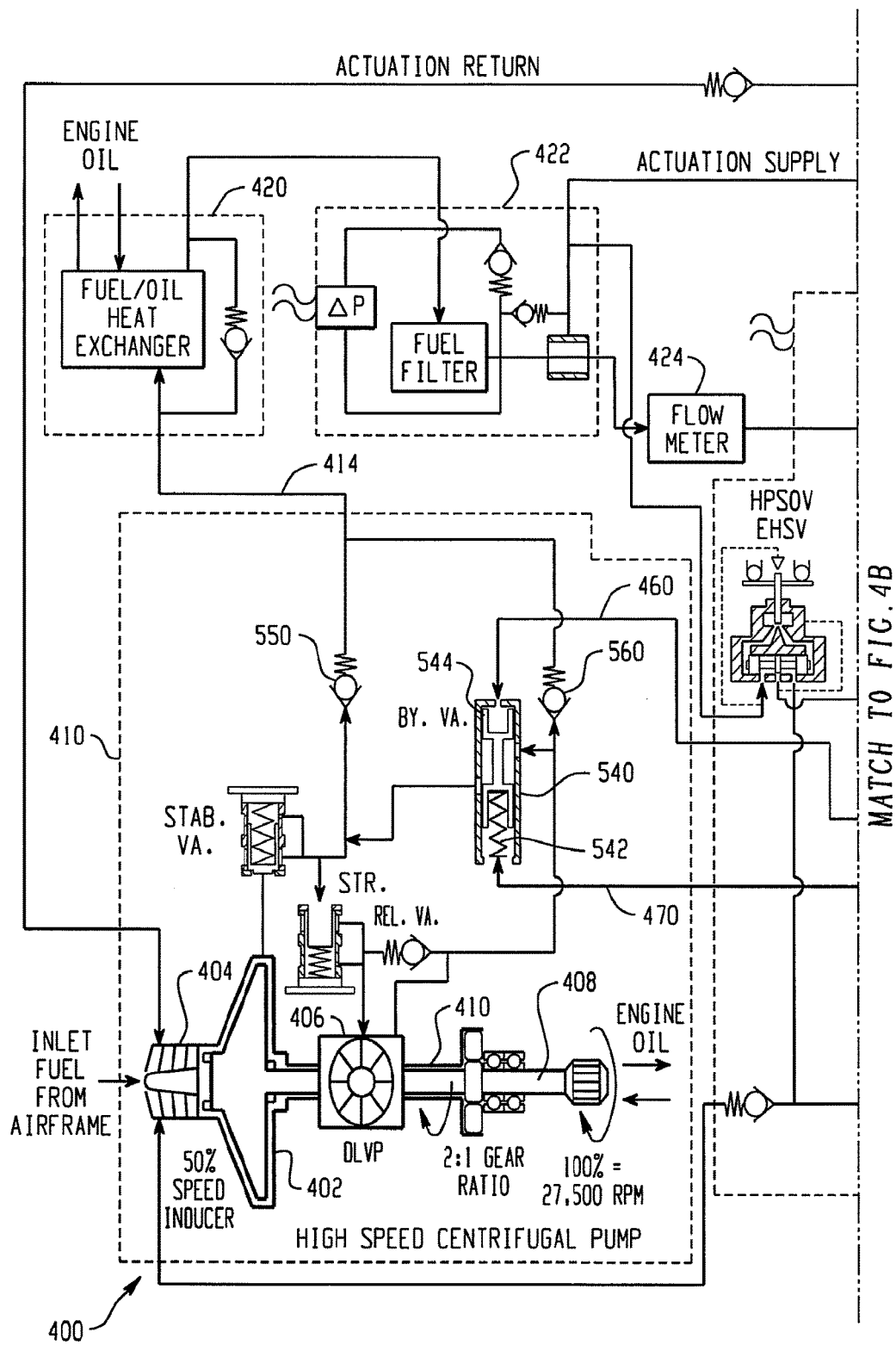
FIG. 4 is a system schematic of a fuel system that provides pressurized fluid to an actuation control module and a fuel metering unit.
Figure 4B:
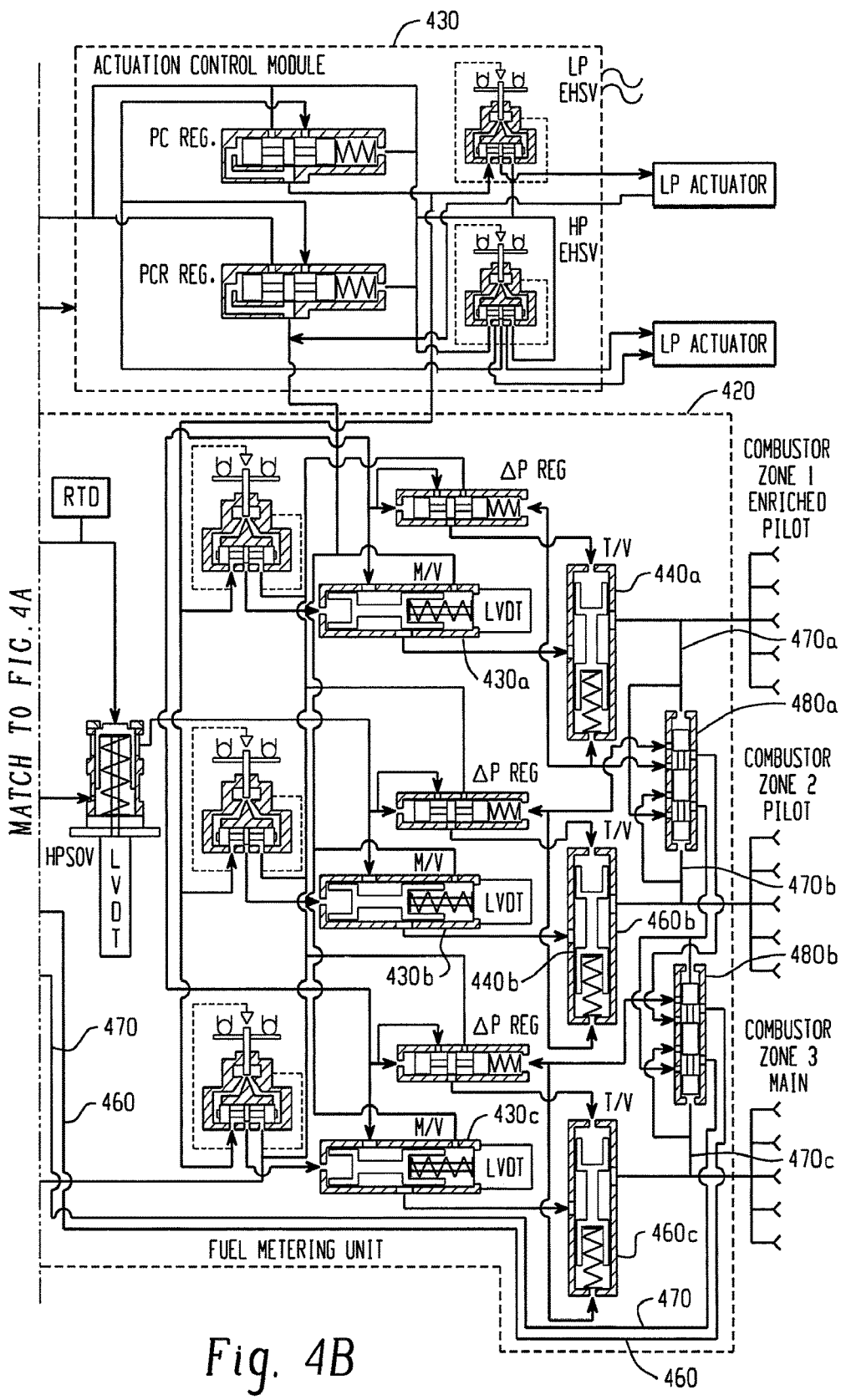

FIG. 4 is a further schematic representation of a pumping and metering system 400 with some differences relative to the above-described schematic of FIG. 3, and with additional detail of the components more generally referred to in FIGS. 1 and 2. For example, the fuel system has a pump unit 410 that includes a high speed centrifugal pump 402 represented by a housing that receives an impeller. An inducer 404 may be provided at the inlet to the centrifugal pump 402 to improve inlet performance. Drive shaft 408 provides the rotational input to the impeller of the centrifugal pump 402. The fixed displacement pump 406 is also rotated by drive shaft 408, and more particularly in this instance includes a coaxial shaft 410 that rotates at a reduced speed (for example 50%) provided by the drive gear transmission that has a desired gear ratio (in this example, a 2:1 gear ratio). Thus as described above, the pump unit 410 provides pressurized fluid 414 to downstream uses. Conventional system components such as a fuel/oil heat exchanger 420, fuel filter 422, and flow meter 424 are interposed between the pump unit 410 and fuel metering unit 420. Likewise, actuation control module 430 receives a portion of this downstream flow as is generally known in the art so that further discussion herein of these conventional components is deemed unnecessary to a full and complete understanding of the present disclosure.

As schematically represented in FIG. 4, multiple metering loops are illustrated and particularly three loops are shown, although a greater or lesser number of loops can be used without departing from the scope and intent of this disclosure. Specifically, each metering loop includes a metering valve 430a, 430b, 430c and a respective throttling valve 440a, 440b, 440c. Pressure downstream of each metering valve 430a, 430b, 430c, and necessarily upstream of the corresponding throttling valve 440a, 440b, 440c is sent as a first signal (460a, 460b, 460c) to a selector 480. The selector 480 is shown here as including two selector valves 480a, 480b that receive respective first pressure signals. In a similar manner, second pressure signals 470a, 470b, 470c are provided from downstream of respective throttling valves 440a, 440b, 440c to at least one of the corresponding selector valves to 480a, 480b. Thus, the first selector valve 480a compares the downstream pressure from the first and second throttling valves 440a, 440b and the signals from the throttling valve with the lowest downstream pressure is communicated to the second selector valve 480b where it is then compared with the downstream pressure from the third throttling valve 440c. The output from the second selector valve 480b is then communicated as first and second pressure signals 460, 470 to a bypass valve control 540 associated with the fixed displacement pump 406. A minimum differential pressure across the throttling valve or metering/throttling valve combination is allowed assuming identical pressure upstream of the throttling or metering valves in the system and, in such a situation, the centrifugal pump 402 is required to meet all, or substantially all, of the system needs. However, if the differential pressure falls below the minimum value, the control signals 460, 470 allow control 540 to alter the delivered flow of fixed displacement pump 406 and thereby increase the delivered flow to provide enough pressure to maintain the minimum pressure level as required to meet system needs. The bypass valve control 540 includes a biasing member such as spring 542 that urges the control toward a first position in the absence of the control signals 460, 470 urging a control member 544 to a different position whereby the amount of bypass flow from the fixed displacement pump 406 may be altered to achieve pressure compensation. A minimum differential pressure is allowable in this system for which the centrifugal pump generates all, or substantially all, of the pressure rise. If the differential pressure falls below this minimum, the control 540 (as altered by the pressure signals 460, 470) signals the bypass valve to begin to close and thus the fixed displacement pump pressure rise will increase to maintain the minimum pressure level across the throttling valve. This method of control provides for a variable pressure compensation level. This ensures that the downstream pressure requirements are always maintained and the system power level is maintained to a minimum. At higher throttling valve pressure differentials, the fixed displacement pump 406 is completely or substantially bypassed.

The pump unit 410 advantageously combines the high speed centrifugal pump stage 402 and the fixed displacement pump 406. Generally, when pressure in excess of what the high speed centrifugal pump can produce alone is required, the fixed displacement pump stage is used as a pressure compensated-style pump to supplement the high speed centrifugal pump output pressure. Typically, the fixed displacement pump 406 will provide the majority of the pump pressure during engine start and at extreme engine takeoff conditions.

First and second biased check valves 550, 560 are located downstream of the centrifugal pump 402 and the fixed displacement pump 406, respectively. In this manner, if one or the other of the centrifugal pump 402 or the fixed displacement pump fails or becomes inoperative, flow from the other pump can provide for engine requirements. In this manner, the pumps can be designed to be fully or partially redundant depending on sizing of the respective pumps relative to the requirements of the system.

The pumping arrangement can be either a single input drive shaft or multiple drive shaft that are shown in the schematics. A low-pressure boost stage is used to provide pressurized fuel through the heat exchanger(s) and filter to supply the high speed centrifugal pump. A high speed centrifugal pump is used to further increase the system pressure to feed the fixed displacement pump. The pressure rise across the fixed displacement pump is controlled by the bypass valve as described above. When the bypass valve is fully open, a minimum pressure rise is maintained across the fixed displacement pump such that the flow not being used by the fuel metering unit is circulated back to the inlet of the fixed displacement pump.

In this manner, a high speed centrifugal pump (which is good for power consumption, desirable for weight, long life, pressure ripple, and downstream uses where there may be multiple zones) is advantageously used. This high speed centrifugal pump is combined with the fixed displacement pump that allows the designer or manufacturer to daisy-chain or add metering valves without having to add another box that meters the flow, splits the flow, etc.

Additional system capability is achieved through use of the fixed displacement pumping stage with the bypass valve control to provide engine start and achieve pressures beyond the maximum delivered by the centrifugal stage. For the fixed displacement pump to work in the throttling style metering system, it must be pressure compensated. The variable hydromechanical method described above was developed to automatically control the bypass flow from the fixed displacement pump to achieve pressure compensation by sensing the pressure drop across at least the throttling valve. This method can be applied to a single metering loop or multiple metering loops. The pressure regulator is used to set the throttling valve position in order to maintain a set differential pressure across the metering valve. The pressure compensation of the fixed displacement pump is achieved through the use of the bypass valve that senses the differential pressure across at least the throttling valve, or in the case of multiple throttling valves, the throttling valve with the lowest differential pressure. A minimum differential pressure is allowable in the system for which the centrifugal pump generates all, or at least substantially all, of the pressure rise. If the differential pressure falls below this minimum, the control signals the bypass valve to begin to close and thus the fixed displacement pump pressure rise will increase to maintain the minimum pressure level across the throttling valve. This method of control provides for a variable pressure compensation level. This ensures that the downstream pressure requirements are always maintained and the system power level is maintained to a minimum. At higher throttling valve pressure differentials, the fixed displacement pump is fully bypassed or substantially bypassed and only provides a minimum contribution to the output from the pump system. Where multiple metering loops are used, a series of selector valves can be used to determine the throttling valve with the lowest differential pressure. This is performed by sensing the pressure downstream of each throttling valve. The output pressures of the selector valve or valves are the control pressures for the bypass valve.

Figure 5A:
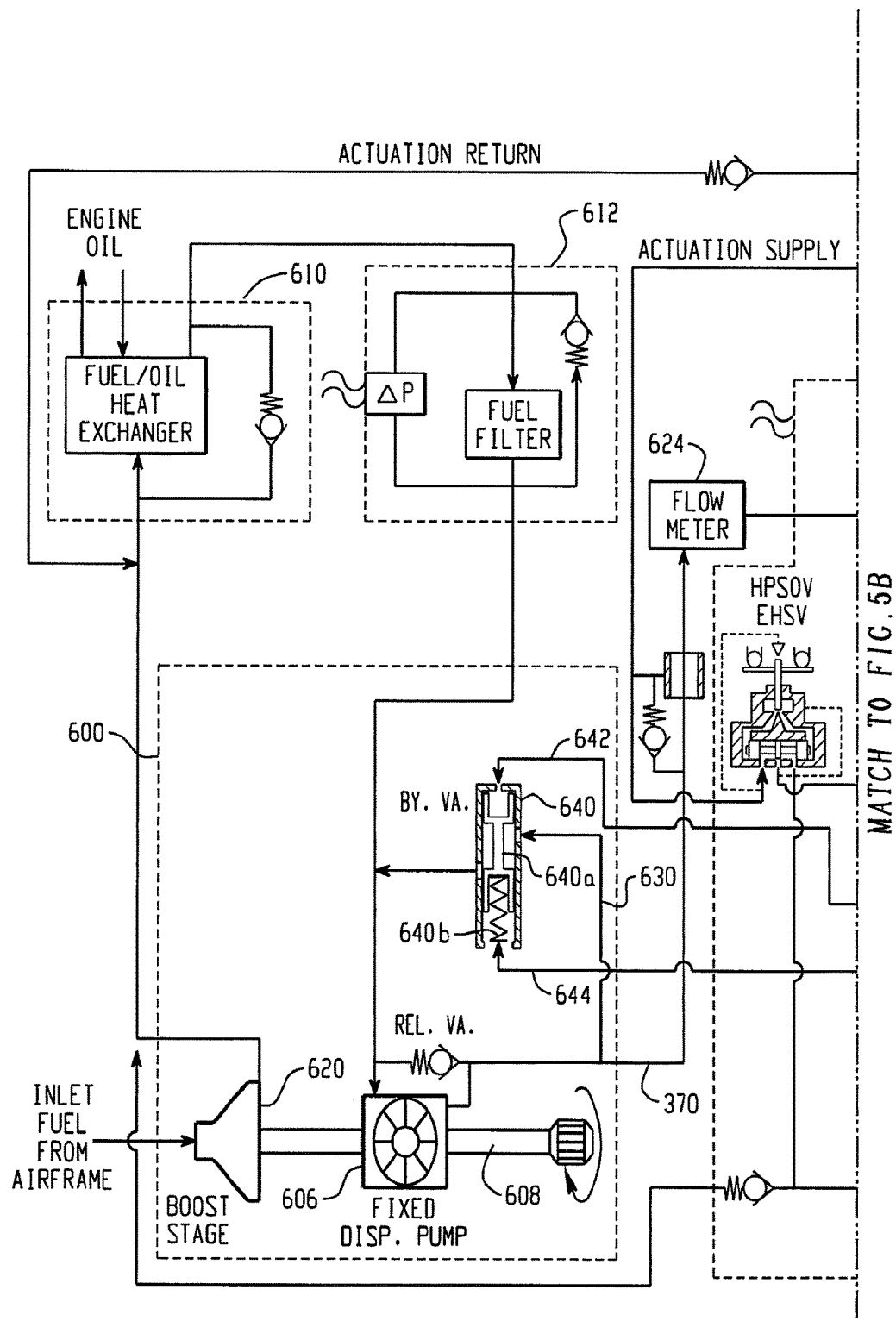
FIG. 5 is a system schematic of another fuel system that provides pressurized fluid to an actuation control module and a fuel metering unit.
Figure 5B:
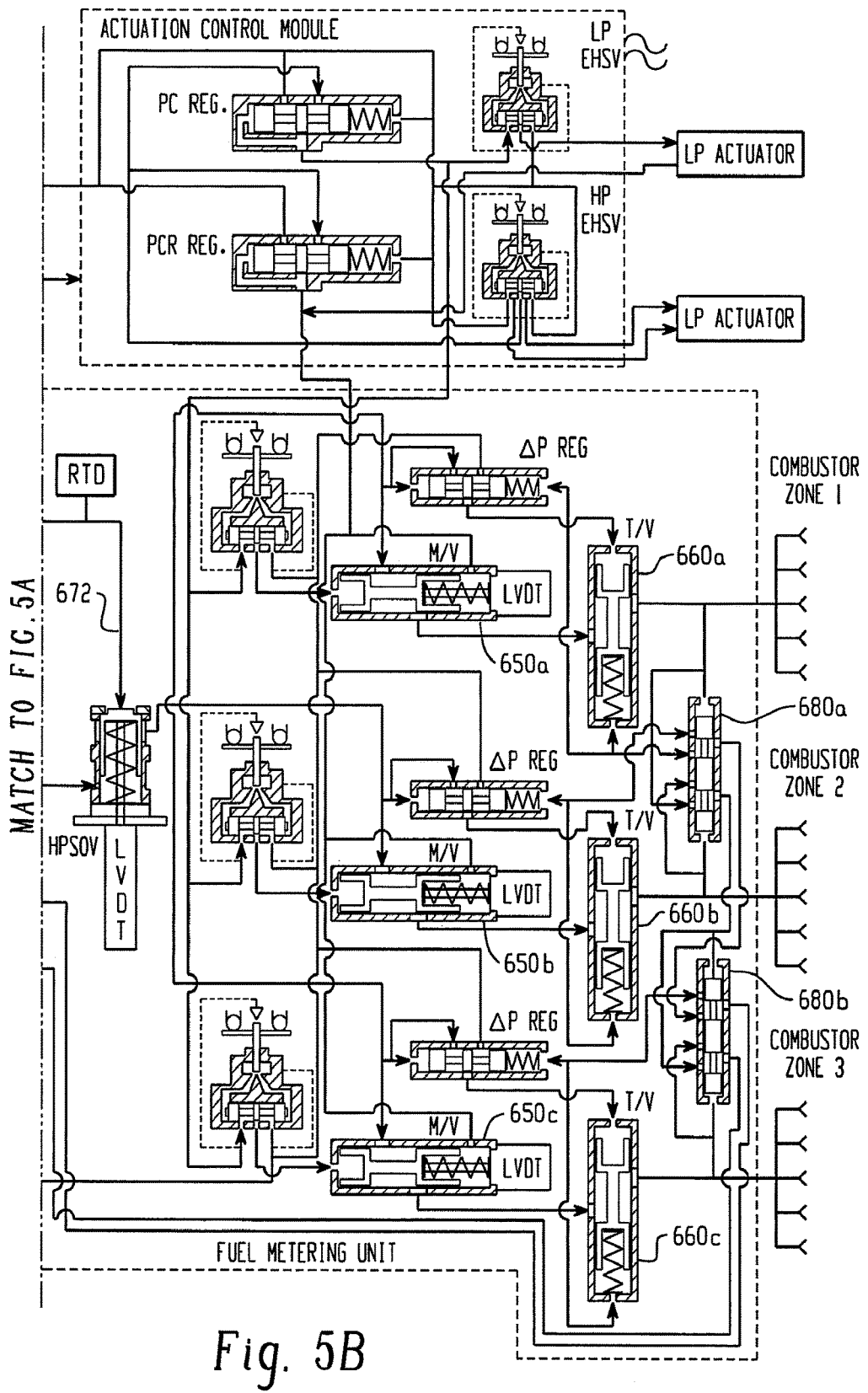

FIG. 5 has many similar components and operates in a generally similar manner to the previously described arrangements. More particularly, and as illustrated in FIG. 5, a fuel system has a pump unit 600 that includes a positive displacement pump, shown here as fixed displacement pump 606. The pump 606 is rotated by drive shaft 608 and receives flow from a boost stage pump 620 that is coaxially driven on the shaft 608. The output from the boost stage pump 620 feeds the fixed displacement pump 606 via fuel/oil heat exchanger 610 and fuel filter 612. Thus, the boost stage pump 620 and the pump 606 are preferably disposed in series relation.

The output from the fixed displacement pump 606 includes a branch passage 630 that leads to bypass valve 640. The bypass valve 640 receives pressure signals 642, 644 from across at least one of the throttling valves 660a, 660b, 660c, in generally the same manner as described above in connection with FIG. 3, or may be signals from across one of the combinations of metering valves 650a, 650b, 650c and the throttling valves 660a, 660b, 660c. More specifically, where there are multiple metering valves (650a, 650b, 650c) and likewise multiple throttling valves (660a, 660b, 660c), the pressure signals 642, 644 are taken from the throttling valve (or throttling valve and metering valve combination) with the lowest differential pressure.

Multiple metering loops are illustrated and particularly three loops are shown, although a greater or lesser number of loops can be used without departing from the scope and intent of this disclosure. Specifically, each metering loop includes a metering valve 650a, 650b, 650c and a respective throttling valve 660a, 660b, 660c. Pressure downstream of each metering valve 650a, 650b, 650c, and necessarily upstream of the corresponding throttling valve 660a, 660b, 660c is sent as a first signal to a selector 680. The selector 680 is shown here as including two selector valves 680a, 680b that receive respective first pressure signals. In a similar manner, second pressure signals are provided from downstream of respective throttling valves 660a, 660b, 660c to at least one of the corresponding selector valves to 680a, 680b. Thus, the first selector valve 680a compares the downstream pressures from the first and second throttling valves 660a, 660b and the signal from the throttling valve with the highest downstream pressure (lowest differential assuming upstream pressures are identical) is communicated to the second selector valve 680b where it is then compared with the downstream pressure across the third throttling valve 660c. The output from the second selector valve 680b is then communicated as first and second pressure signals 642, 644 to the bypass valve control 640 associated with the fixed displacement pump 606. The control signals 642, 644 allow control member 640a of the bypass valve 640 to alter the delivered flow of fixed displacement pump 606 and thereby increase the delivered flow to provide enough pressure to maintain the minimum pressure level as required to meet system needs. The bypass valve control member 640a includes a biasing member such as spring 640b that urges the control toward a first position in the absence of the control signals 642, 644 urging the control member 640a to a different position whereby the amount of bypass flow from the fixed displacement pump 606 may be altered to achieve pressure compensation. A minimum differential pressure is allowable in this system and if the differential pressure falls below this minimum, the control 640 (as determined by the pressure signals 642, 644) signals the bypass valve 640 to begin to close and thus the fixed displacement pump pressure rise will increase to maintain the minimum pressure level across the throttling valve. This method of control provides for a variable pressure compensation level. This ensures that the downstream pressure requirements are always maintained and the system power level is maintained to a minimum.

The fixed displacement pump stage 606 is used as a pressure compensated-style pump. The fixed displacement pump 606 will provide the pump pressure during engine start and at extreme engine takeoff conditions.

It is desirable to have a variable pressure compensation level. In the schematics shown, the metering unit can have one or more metering loops comprised of a metering valve, pressure regulator, and throttling valve. The pressure regulator is used to set the throttling valve position in order to maintain a desired differential pressure across the metering valve. The pressure compensation of the fixed displacement pump is achieved through the use of the bypass valve that senses the differential pressure across the throttling valve, or in the case of multiple throttling valves, the throttling valve with the lowest differential pressure. Differential pressure can also be sensed across both the throttling and metering valves.

The exemplary embodiments have been described with reference to the preferred embodiments. Obviously, modifications and alterations will occur to others upon reading and understanding the preceding detailed description. For example, the number of metering loops, metering valves, throttling valves, number of independent pumping stages (i.e. multiple input drive sources) and even the use/non-use of a centrifugal pump, may vary depending on the number of downstream uses. Further, numerical values of the pressure ranges or shaft speeds are exemplary only and may vary depending on the particular system. This disclosure is intended to describe exemplary embodiments that can be construed as including all such modifications and alterations insofar as they come within the scope of the appended claims or the equivalents thereof. It is also noted that each feature of each specific embodiment disclosed herein is not considered essential to that specific embodiment and that features disclosed in one embodiment can be added or substituted with another embodiment.

What is claimed is:

1. A fuel system comprising:
   a pump unit that supplies pressurized flow, the pump unit includes a first pump that communicates with an inlet of a second pump, at least one of the first and second pumps being a fixed displacement pump;
   a fuel control assembly receiving flow from the pump unit, the fuel control assembly including at least one metering valve and at least one throttling valve receiving flow from the metering valve; and
   a control for the fixed displacement pump including a bypass valve that selectively alters operation of the fixed displacement pump in response to a pressure differential across the throttling valve.

2. The fuel system of claim 1 wherein a first signal of the pressure differential across the throttling valve is received by the control from downstream of the metering valve.

3. The fuel system of claim 2 wherein a second signal of the pressure differential across the throttling valve is received by the control from downstream of the throttling valve.

4. The fuel system of claim 1 wherein a first signal of the pressure differential across the throttling valve is received by the control from downstream of the metering valve and upstream of the throttling valve.

5. The fuel system of claim 4 wherein a second signal of the pressure differential across the throttling valve is received by the control from downstream of the throttling valve.

6. The fuel system of claim 1 wherein the control is a hydromechanical pressure compensation assembly and first and second signals of the pressure differential across the throttling valve are pressure signals.

7. The fuel system of claim 1 wherein if more than one throttling valve is present a first signal of the pressure differential across the throttling valve is representative of the throttling valve with the lowest differential pressure.

8. The fuel system of claim 1 wherein the other of the first and second pumps is a centrifugal pump and at a minimum differential pressure only the centrifugal pump provides pressure to the fuel control assembly.

9. The fuel system of claim 8 wherein at higher differential pressures, the fixed displacement pump is fully bypassed by the control.

10. The fuel system of claim 8 wherein if the differential pressure falls below the minimum differential pressure, the control reduces an output flow amount that is bypassed from the fixed displacement pump and provides enough pressure to maintain the minimum pressure level across the throttling valve.

11. The fuel system of claim 1 wherein the first and second pumps are driven at different relative rotational speeds.

12. The fuel system of claim 11 wherein the other of the first and second pumps is a centrifugal pump and the fixed displacement pump is driven at approximately 50% of the rotational speed of the centrifugal pump.

13. The fuel system of claim 11 wherein the other of the first and second pumps is a centrifugal pump and the fixed displacement pump and the centrifugal pump are coaxially driven.

14. The fuel system of claim 1 wherein the other of the first and second pumps is a centrifugal pump and further comprising an inducer stage driven at a reduced rotational speed to operatively improve inlet performance characteristics of the centrifugal pump.

15. A method of operating a fuel system comprising:
providing a pump unit that includes first and second pumps, at least one of the pumps being a fixed displacement pump to supply pressurized flow;
providing a fuel control assembly that receives flow from the pump unit, the fuel control assembly including at least one metering valve and at least one throttling valve;
monitoring pressure differential across the throttling valve wherein the monitoring step includes receiving a first signal from downstream of the metering valve; and
controlling operation of the pump unit including using a bypass valve that selectively alters operation of the fixed displacement pump in response to the pressure differential.

16. The method of claim 15 wherein the monitoring step includes receiving a second signal from downstream of the throttling valve.

17. The method of claim 15 wherein the monitoring step includes receiving the first signal from upstream of the throttling valve.

18. The method of claim 17 wherein the monitoring step includes receiving a second signal from downstream of the throttling valve.

19. The method of claim 15 wherein the other of the first and second pumps is a centrifugal pump and at a minimum differential pressure the method includes using only the centrifugal pump to provide pressure to the fuel control assembly.

20. The method of claim 19 wherein if the differential pressure falls below the minimum differential pressure, the method includes closing a bypass valve operatively associated with the fixed displacement pump to provide enough pressure to maintain the minimum pressure level across the throttling valve.

21. A fuel system comprising:
a pump unit that supplies pressurized flow, the pump unit includes a fixed displacement pump;
a fuel control assembly receiving flow from the pump unit, the fuel control assembly including at least one metering valve and at least one throttling valve; and
a control for the fixed displacement pump including a bypass valve that selectively alters operation of the fixed displacement pump in response to receiving first and second signals indicative of a pressure differential across at least the throttling valve, wherein the first signal is received from downstream of the metering valve.

22. The fuel system of claim 21 wherein the second signal is received from downstream of the throttling valve.

23. The fuel system of claim 21 wherein the first signal is received from upstream of the throttling valve.

24. The fuel system of claim 23 wherein the second signal is received from downstream of the throttling valve.

25. A method of operating a fuel system comprising:
providing a pump unit that includes a fixed displacement pump to supply pressurized flow;
providing a fuel control assembly that receives flow from the pump unit, the fuel control assembly including at least one metering valve and at least one throttling valve;
monitoring pressure differential across the throttling valve, or across the throttling valve and metering valve combination, wherein the monitoring step includes receiving a first signal from downstream of the metering valve; and
controlling operation of the pump unit including using a bypass valve that selectively alters operation of the fixed displacement pump in response to the pressure differential.

26. The method of claim 25 wherein the monitoring step includes receiving a second signal from downstream of the throttling valve.

27. The method of claim 25 wherein the monitoring step includes receiving the first signal from upstream of the throttling valve.

28. The method of claim 27 wherein the monitoring step includes receiving a second signal from downstream of the throttling valve.

* * * * *